United States Patent

Dinizo, Jr.

[15] 3,677,408
[45] July 18, 1972

[54] SWIMMING POOL WATER PURIFIER

[72] Inventor: Philip T. Dinizo, Jr., 1029 Mountain Avenue, Berkeley Heights, N.J. 07922

[22] Filed: Jan. 21, 1971

[21] Appl. No.: 108,451

[52] U.S. Cl. ............................................................210/169
[51] Int. Cl. ............................................................E04h 3/20
[58] Field of Search ..................210/62, 169, 242; 15/1.7; 137/268

[56] References Cited

UNITED STATES PATENTS

| | | | |
|---|---|---|---|
| 3,169,920 | 2/1965 | Payne | 210/169 |
| 3,401,116 | 9/1968 | Stanwood | 210/62 |
| 3,444,566 | 5/1969 | Spear | 137/268 X |
| 3,460,562 | 8/1969 | Moulder | 137/268 |

Primary Examiner—Reuben Friedman
Assistant Examiner—Theodore A. Granger
Attorney—Peter J. Gaylor

[57] ABSTRACT

A swimming pool water purifier encased in the inner wall of a swimming pool, comprises a chamber located behind the wall of the pool and extending out of the pool wall in an opening. A skimmer is placed in this chamber and it has at least its rear wall portion perforated to permit the flow of water through it. Another chamber is located behind the first, and it has a coverable top opening. In the second chamber, a container is placed therein and it holds a solid purifying agent designed to liberate slowly a dissolved purifying agent into the water. The container may have a wall opening of controllable area for maintaining a predetermined concentration of purifying agent in the water.

3 Claims, 5 Drawing Figures

Patented July 18, 1972

3,677,408

INVENTOR.
PHILIP T. DINIZO, JR
BY
ATTORNEY

SWIMMING POOL WATER PURIFIER

BACKGROUND OF THE INVENTION

This invention deals with the feeding of controlled quantities of water purifying agent in swimming pools. At the present time, most swimming pools are equipped with a skimmer which is located in the pool wall and which serves to skim off the flotsam from the pool. A filter is usually used to filter the water pumped from the skimmer before it is returned to the pool.

For purifying the water, some pool owners throw the purifying chemicals, such as chlorine-containing chemicals, into the pool. Recently, compressed chemicals, such as those sold under the tradename "7-Day Tab" are marketed with attached floats, which float on the surface of the pool and feed the chemical gradually into the water. These have the disadvantage of being picked up by children who may become injured thereby. Some of such compressed chemicals are inserted in a cylinder attached to the filter outlet. However, for replacement, they require shutting down of the filter and the tedious unscrewing of the cap, an inconvenience and a time-consuming operation.

SUMMARY OF THE INVENTION

According to the present invention, a manhole-covered chamber is provided in the pool wall alongside of and interconnected with the skimmer chamber, and a container is inserted therein containing the slow-feeding purifying chemical. When the skimmer wall is perforated, pool water will seep into the purifier chamber so that a controlled amount of purifier agent is fed into the water. The container carrying the chemical is desirably provided with an area controlled wall opening to control the amount of chemical fed into the skimmer.

By employing such a system, replacement of chemical is simple through the manhole, and there is no danger of contact by the swimmer with the concentrated chemical.

BRIEF DESCRIPTION OF THE DRAWINGS

The invention will be more readily understood by reference to the accompanying drawings in which a preferred embodiment is described, and in which.

The same numerals refer to the same or similar parts in the various figures.

DESCRIPTION OF THE PREFERRED EMBODIMENTS

Figure 1:
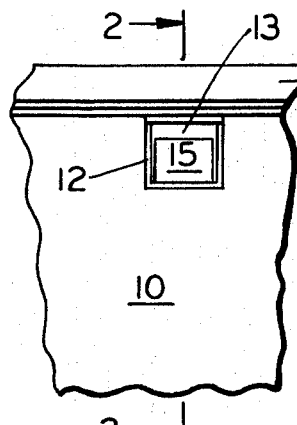
FIG. 1 depicts a front elevational view of a skimmer installation in the inner wall of a swimming pool.
Figure 2:
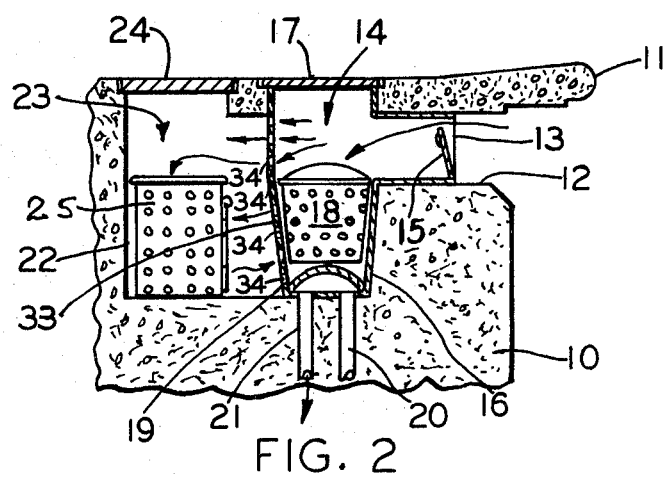
FIG. 2 illustrates a cross sectional view taken along the plane of line 2—2 in FIG. 1.

Referring again to the drawings, and particularly first to FIGS. 1 and 2, numeral 10 represents an inner side wall of a swimming pool, usually made of concrete, and having an upper ledge 11, and an opening 12 under said ledge. Within this opening is the open throat 13 of a conventional skimmer, indicated generally as 14, said skimmer having a conventional floating weir 15. Skimmer 14 is disposed in a chamber or cavity 16 in the concrete wall 10, and access to it is possible through removable manhole cover 17. Such a skimmer generally is made of hard plastic material, although metal may be used. A conventional perforated basket 18, also of plastic or metal, is placed in the lower portion 19 of the skimmer, and it serves to collect leaves and other flotsam from the pool. When filled, basket 18 may be removed through the manhole covered by lid 17. Inlet line 20 is provided for the main drain, while outlet line 21 is used to convey pool water to a filter pump.

Figure 4:
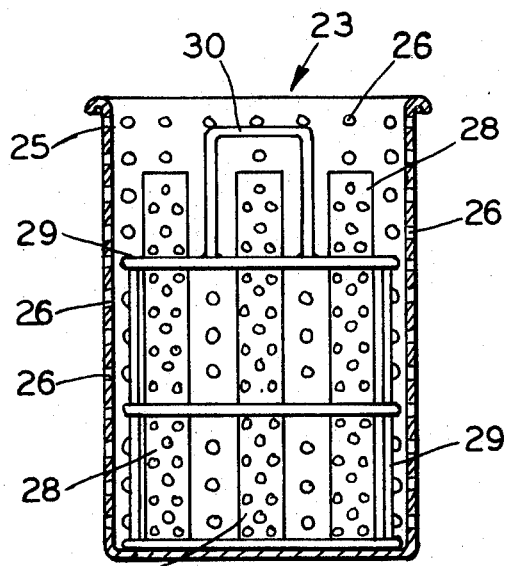
FIG. 4 presents a cross-sectional side view of a modified form of the purifier shown in FIG. 3, taken along the plane of line 4—4 in FIG. 3.
Figure 3:
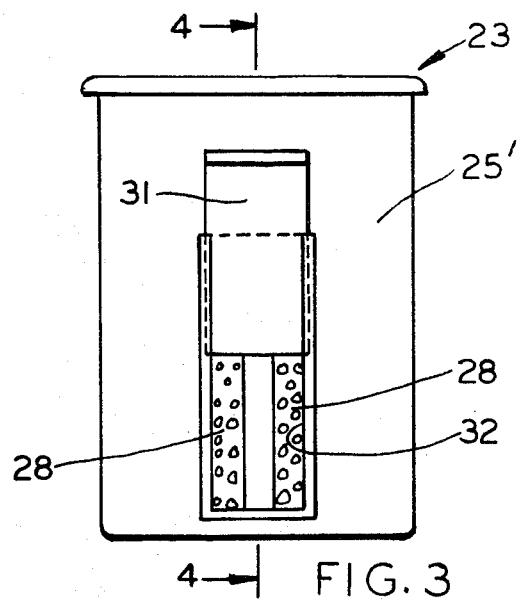
FIG. 3 shows an enlarged front view of a water purifier of the present invention, as included in the skimmer installation shown in FIGS. 1 and 2.
Figure 5:
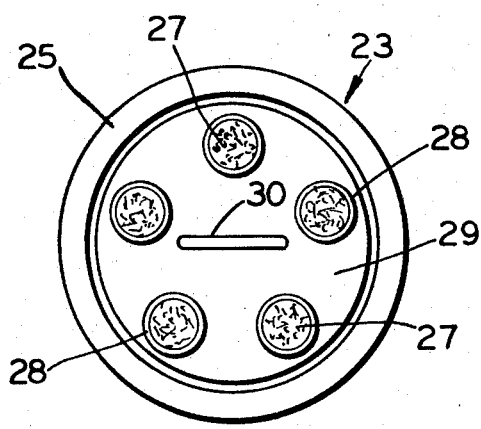
FIG. 5 shows the top or plan view of the water purifier illustrated in FIGS. 3 and 4.

Behind, or alongside of, chamber 16, and interconnected therewith, is another chamber or cavity 22 in wall 10. In this chamber is placed the water purifier of the present invention, indicated generally as 23, which is removable from chamber 22 after lifting manhole cover 24. As shown in FIGS. 3–5, purifier 23 comprises a perforated (or unperforated) basket or container 25 having perforations 26 through which the pool water may seep. Inside of basket 25 is inserted the purifying material 27 for purifying the water. This may be, for example, a chlorine-liberating chemical, in the form of compressed tablets, bricks, sticks, or the like. They are desirably in compressed form so that they liberate the chlorine slowly and thus are not consumed immediately, but are dissolved slowly for a period of a week, or so.

When the purifying material 27 is in stick or tablet form, it is desirably placed in long perforated narrow containers 28 which are positioned in spaced relation in carrying tray 29, having handle 30 for removal from chamber 22. If desired, plastic basket 25 may be unperforated, such as basket 25' in FIG. 3. In this case, provision is made to adjust the flow of water through the basket by a sliding gate 31 which may be raised or lowered vertically to control the size of opening 32 in the wall of basket 25'.

The back wall portion 33 of skimmer 14 is perforated with holes 34 to permit chlorinated water from chamber 22 to flow into skimmer chamber 16, and from there to the filter and then the pool. Although a sliding gate 31 is shown in FIG. 3 as a means for controlling the size of opening 32 for maintaining a predetermined concentration of chlorine in the water, other opening control means known to the art may be used in lieu thereof. Also, although chlorine has been specified as the purifying medium, other chemicals, such as iodine, oxygen, and the like, may be used. Furthermore, although chamber 22 has been described as a separate chamber, it is to be understood that it may be an extension of chamber 16. And, although two manhole covers 17 and 24 are described, only one may be used provided it is possible to take out basket 18 and/or purifier 28 therefrom.

I claim:

1. A swimming pool water purifier disposed within the side wall of a swimming pool, said wall having an opening for allowing ingress of pool water therein, comprising:
    a first chamber disposed behind said opening in said wall, and having sides and a coverable top access opening leading to outside said wall and having a side opening in register with said wall opening and also having an additional side seepage opening and a bottom opening,
    a skimmer disposed within said chamber and in said wall opening for skimming debris from water entering therethrough and having a bottom discharge in said chamber bottom opening and having sides, at least a portion of which are perforated to permit skimmed water to flow therethrough and through said seepage opening,
    a second chamber disposed adjacently to said first chamber and having a bottom and having sides interconnected with said first chamber in water seepage relation and having a coverable top access opening leading to outside said wall,
    at least one container disposed on the bottom of said second chamber, and
    a solid purifying agent disposed within said container and designed to liberate slowly a dissolvable purifying agent into said water seeping therein from said first chamber.

2. A swimming pool water purifier, according to claim 1, in which said container has an opening, and
    an area control means disposed on said container for controlling the area of said opening.

3. A swimming pool water purifier, according to claim 1, in which said container has wall perforations to permit flow of water therethrough.

* * * * *